United States Patent [19]

Opheij et al.

[11] Patent Number: 4,868,373
[45] Date of Patent: Sep. 19, 1989

[54] MEMORY CARD COMPRISING AN OPTICAL MEMORY DISC AND MICROELECTRONIC MEMORY COMPONENT, AND APPARATUS FOR TRANSFERRING INFORMATION TO AND FROM SUCH CARD

[75] Inventors: Willem G. Opheij; Arie Huijser; Gary E. Thomas, all of Eindhoven, Netherlands

[73] Assignee: U.S. Philips Corporation, New York, N.Y.

[21] Appl. No.: 833,923

[22] Filed: Feb. 27, 1986

[30] Foreign Application Priority Data

Dec. 11, 1985 [NL] Netherlands ......................... 8503410

[51] Int. Cl.⁴ .......................... G11B 13/00; G06K 7/01
[52] U.S. Cl. ..................................... 235/380; 235/492; 235/488; 235/454; 235/441; 235/486; 235/475; 369/111; 369/14; 369/72; 369/273
[58] Field of Search ....................... 360/2, 137; 369/14, 369/15, 18, 52, 53, 54, 58, 72, 204, 231, 233, 263, 264, 270, 282, 273, 111; 235/487, 488, 492, 439, 440, 451, 441, 454, 443, 470, 475, 485, 486, 380

[56] References Cited

U.S. PATENT DOCUMENTS

| | | | |
|---|---|---|---|
| 1,121,239 | 12/1914 | Fuller | 369/273 |
| 2,010,867 | 8/1935 | Kubo | 369/273 |
| 3,588,123 | 6/1971 | Candella | 369/72 |
| 3,608,909 | 9/1971 | Rabinow | 369/270 |
| 3,885,094 | 5/1975 | Russell | 369/44 |
| 3,919,697 | 11/1975 | Walker | 369/44 |
| 4,102,569 | 7/1978 | Schwartz | 360/2 |
| 4,334,233 | 6/1982 | Murakami | 369/275 |
| 4,431,911 | 2/1984 | Rayburn | 235/443 |
| 4,441,178 | 4/1984 | Kobayashi | 369/270 |
| 4,480,178 | 10/1984 | Miller et al. | 235/380 |
| 4,529,870 | 7/1985 | Chaum | 235/380 |
| 4,550,248 | 10/1985 | Hoppe et al. | 235/492 |
| 4,575,621 | 3/1986 | Dreifus | 235/380 |
| 4,592,042 | 5/1986 | Lemelson et al. | 235/475 |
| 4,598,196 | 7/1986 | Pierce et al. | 235/454 |
| 4,612,436 | 9/1986 | Okada | 235/492 |
| 4,615,753 | 10/1986 | Gregg | 369/275 |
| 4,646,086 | 2/1987 | Helzel | 340/347 P |
| 4,650,981 | 3/1987 | Foletta | 235/492 |
| 4,672,182 | 6/1987 | Hirokawa | 235/492 |

FOREIGN PATENT DOCUMENTS

| | | |
|---|---|---|
| 2505523 | 5/1981 | France . |
| 54-19709 | 2/1979 | Japan ................................. 360/2 |
| 61-16045 | 1/1986 | Japan ................................. 369/111 |
| 61-16082 | 1/1986 | Japan ................................. 360/2 |
| 61-280086 | 12/1986 | Japan ................................. 369/72 |
| 82/02969 | 9/1982 | World Int. Prop. O. . |

Primary Examiner—Alan Faber
Assistant Examiner—Robert A. Weinhardt
Attorney, Agent, or Firm—Algy Tamoshunas; Leroy Eason

[57] ABSTRACT

Apparatus for transferring data and other information between a data processing unit and a rectangular memory card which includes an optically readable data memory unit having a succession of substantially concentric data storage tracks thereon, the card also including at least one microelectronic component which stores further information. Such component is connected to connection points on the surface of the card. Data is read from the tracks of the memory unit by optical scanning during rotation of the card about the axis of symmetry of the memory unit, and information is transferred between the microelectronic component and the data processing unit by an information transfer unit which is coupled to the connection points on the card and to the data processing unit.

18 Claims, 3 Drawing Sheets

MEMORY CARD COMPRISING AN OPTICAL MEMORY DISC AND MICROELECTRONIC MEMORY COMPONENT, AND APPARATUS FOR TRANSFERRING INFORMATION TO AND FROM SUCH CARD

BACKGROUND OF THE INVENTION

1. Field of the Invention

The invention relates to apparatus for the transfer of data between an electronic memory card i.e., a card which includes a microelectronic component (smart card) and a data processing unit, the body of the electronic memory card including an optical memory unit which can at least be read, such apparatus including means for bringing the card into a predetermined position with respect to optical scanning means which reads data stored therein and transfers such data to the data processing unit.

2. Description of the Related Art

Apparatus of this kind is known from the international patent application PCT No. WO82/02969. The electronic memory card used in the known apparatus includes an optical memory which is formed by a strip of optical material provided on the memory card. The data is line-wise stored in the strip in successive tracks. Data transfer between the optical memory and a data processing unit is effected by a laser beam which linewise scans the strip of optical material after the memory card and the laser beam have been positioned with respect to one another.

French patent application No. 81 08901 (publication No. 2 505 523) discloses such an arrangement wherein the memory unit is a strip of magnetic material accommodated in the body of the card. The data is stored in successive linear tracks in such strip. Data transfer between the memory and the data processing unit is realized by line-wise scanning of such tracks after the card and the scanning means have been positioned with respect to one another. The card also includes a microelectronic circuit which is connected to transfer means, for example electrical connection terminals, which are suitable for communication with cooperating transfer means connected to the data processing unit.

It is a drawback of the known apparatus that during the line-wise scanning of the memory card either the scanning means or the card has to be continuously moved forward and back along successive lines in order to realize the data transfer. In addition to the frequent transport of the scanning means or the card, which itself is comparatively time-consuming, for each of the successive lines to be scanned the laser beam and the card must again be positioned with respect to the relevant line. This operation itself is also time-consuming and, moreover, necessitates the use of precise, special positioning means. These time-consuming operations have an adverse effect on the data transfer rate.

SUMMARY OF THE INVENTION

It is the object of the invention to provide apparatus for the transfer of data between an electronic memory card and a data processing unit in which the data transfer rate is higher and in which the positioning of the scanning means and the card with respect to successive tracks is simpler and faster.

To achieve this, apparatus in accordance with the invention is characterized in that it comprises rotary retaining means which is suitable for driving at least the optical memory of the card in a rotary fashion about an axis which extends perpendicularly to the surface of the rotary retaining means and which coincides substantially with an axis of rotational symmetry of the optical memory, a scanning beam from the scanning means being radially displaceable along a continuous succession of tracks of the optical memory. Because the optical memory is rotationally symmetrical, the data is now stored in spiral substantially concentric tracks. During the data transfer, the rotary retaining means causes the optical memory to rotate about its axis of rotational symmetry and the scanning means is radially driven across successive tracks. The successive tracks can thus be continuously scanned so that the data transfer rate is substantially increased. As a result of the continuity of the tracks, positioning with respect to successive tracks can be dispensed with.

In a first preferred embodiment of apparatus in accordance with the invention the memory card includes electrical connection points which are connected to microelectronic components included in the medium of the card. The apparatus includes an information transfer unit connected to said connection points for the transfer of further information between the microelectronic components and the data processing unit. The microelectronic components may include, for example, a memory (RAM) and a data processor. The addition of such components increases the range of applications of the card, because the card can then be used as an active electronic element of the apparatus.

Preferably, the information transfer unit is arranged on the rotary retaining means. Transfer of the further information is then possible during rotation of the memory card, the information transfer unit rotating together with the optical memory. As a result, said data and said further information are simultaneously transferred.

Preferably, as shown in FIG. 2, the information transfer unit includes a first optical transmitter/receiver element 19a, a second optical transmitter/receiver element 19b being included in the data processing unit, the first and the second optical transmitter/receiver element being suitable for communicating with one another over a path 19c. This enables optical communication between the data processing unit and the transfer unit. Notably in the case of a rotating transfer unit optical communication is advantageous, because mechanical contacts are then no longer necessary.

In a further embodiment of apparatus in accordance with the invention, the transfer unit and the data processing unit include cooperating capacitive or inductive coupling for executing said transfer of further information. Capacitive or inductive coupling also render mechanical contact superfluous.

A second preferred embodiment of apparatus in accordance with it invention is characterized in that the includes a positioning unit for controlling the rotary retaining means to be the memory card into a predetermined position with respect to the scanning means. For the execution of data transfer between the scanning means and the optical memory it is necessary to precisely position the scanning means and the optical memory with respect to one another for scanning the card introduced into the apparatus. This is achieved by the positioning unit.

Preferably, the positioning unit includes a detection system for detecting any deviation between the axis of the rotary retaining means and the axis of symmetry of the tracks on the optical memory, said detection system including at least one radiation source which emits a substantially parallel beam and at least two radiation-sensitive detection elements which generate a detection signal which provides an indication as regards such deviation, the positioning unit being connected to the rotary retaining means in order to apply the detection signal thereto. The rotary retaining means includes means for moving the memory card with respect to the scanning means under the control of the received detection signal. The positioning operation can thus be performed by utilizing the track structure of the optical memory. Moreover, the use of such a positioning unit eliminates the need for a central hole in the optical memory, so that the optical storage capacity is higher. Moreover, the manufacture of an optical memory and of a memory card including the optical memory is simpler when the optical memory does not include a central hole.

The positioning unit preferably includes a first and a second detection system, the first and the second detection system being suitable for executing said positioning operation in a first and a second direction, respectively, which are substantially mutually perpendicular. The memory card can thus be positioned in two mutually perpendicular directions.

For an alternative positioning method the optical memory is provided with a positioning mark, the positioning unit being connected to the rotary retaining means to cause it to bring the memory card into a predetermined position with respect to the scanning means by means of the positioning mark.

Preferably, the rotary retaining means includes a turntable on which there are provided controllable clamps for clamping and positioning the memory card on the turntable. The rotary retaining means can thus be simply constructed.

A third preferred embodiment of apparatus in accordance with the invention is characterized in that the optical memory is provided with a hole therein whose centre coincides with the axis of rotational symmetry of the optical memory, the rotary retaining means including a shaft which extends into the hole in the memory card. This embodiment enables simple positioning of the optical memory and the scanning means with respect to one another.

A fourth preferred embodiment of apparatus in accordance with the invention is characterized in that it includes a protective plate which is arranged on transport means which serve to position the protective plate on the optical memory, and a spray nozzle for spraying a quantity of volatile liquid onto the optical memory. The liquid applied to the optical memory by means of the spray nozzle fills any scratches therein, and the protective plate ensures that the liquid is not spun off the optical memory surface during rotation.

A first preferred embodiment of an electronic memory card for use in combination with apparatus in accordance with the invention is characterized in that the optical memory therein is rotationally symmetrical and includes a structure of successive tracks. A rotationally symmetrical optical memory may be a spiral or concentric track pattern.

Preferably, the memory card includes a power supply source for powering the microelectronic component therein. Connection points for powering such components can then be dispensed with.

Preferably, the power supply source includes a photosensitive cell which is arranged on the surface of the memory card and which serves to convert incident light into electric energy. This offers a realization of the power supply source of the card, adapted to the environment.

Preferably, the memory card includes a light source which is connected to the power supply source and to the microelectronic components for realizing the transfer of information between the card and the information transfer unit. This enables optical transfer of information between the information transfer unit and the microelectronic components of the card.

A further preferred embodiment of an electronic memory card is characterized in that the optical memory is detachably accommodated in the medium of the memory card. Removal of the optical memory from the card renders the card unsuitable for further use, the card thus being protected.

Preferably, the optical memory includes a data layer which is accommodated on a substrate between two protective layers. The data layer is thus protected against damage, for example, scratches.

Preferably, a first protective layer is made of plastics foil, a second protective layer being made of reinforced glass or plastics with a silicon layer. A high-quality protective layer is thus obtained.

The diameter of the optical memory preferably amounts to from 2 cm to 5 cm. The memory thus has ample capacity and can, moreover, be embedded in a memory card having standard dimensions.

BRIEF DESCRIPTION OF THE DRAWINGS

The invention will be described in detail hereinafter with reference to the drawing; therein:

FIG. 1b is a cross-sectional view of the electronic memory card shown in FIG. 1a;

FIG. 6b is a plan view of a detail of the modified apparatus shown in FIG. 6a.

DESCRIPTION OF THE PREFERRED EMBODIMENTS

Figure 1A:
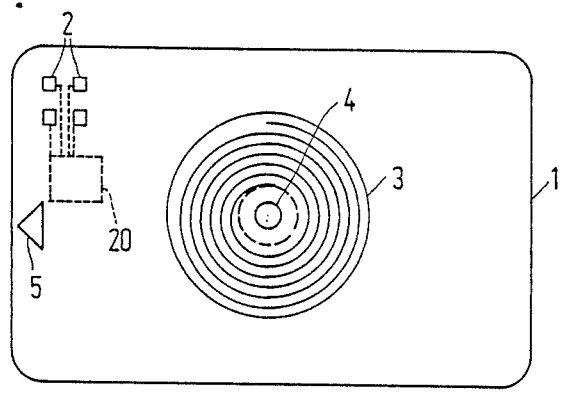
FIG. 1a shows a first embodiment of an electronic memory card in accordance with the invention.

FIG. 1a shows a first embodiment of an electronic memory card in accordance with the invention. The memory card 1 is preferably made of plastics and includes electrical connection points 2 for realizing an electrical connection between the microelectronic components accommodated inside the card and an external information transfer device. The arrow 5 denotes the direction in which the card is to be introduced into a transfer device. The memory card furthermore includes a disc-shaped optical memory 3 in which data can be stored and/or written. The optical disc is manufactured using a technology which is analogous to that used for the manufacture of optical discs such as, for example, Compact Discs (CD). In the centre of the optical memory disc there is provided a circular hole 4. The optical memory is arranged in the memory card in a permanently fixed or detachable manner, for example, by snapping in and out. The optical memory disc is completely or at least partly recessed in the memory card.

In the optical memory disc data is stored in digital form in spiral. It concentric tracks or is stored therein as known, for example, for CD discs or other known optical memory discs (VLP, DOR) (see, for example, the book "Principles of the Optical Disc Systems", by G. Bouwhuis et al, published by Adam Hilger Ltd., Bristol and Boston, 1985). The pitch of the successive tracks of the optical memory disc preferably equals that used for CD, that is to say 1.6 μm. The advantage of this choice consists in that the tracking and correction techniques used for Compact Discs can then also be used. Moreover, this track pitch is also attractive in view of the susceptibility to scratching of the optical material. Furthermore, for the same reasons it is advantageous to use the same dimensions as used for the CD for the spot size of the scanning member. An attractive dimension for the optical memory disc is a diameter of between 2 and 5 cm, for example, 3 cm. A diameter of 5 cm can still be accommodated within the standard dimensions of a memory card (8.6×5.4 cm). When use is made of a diameter of 3 cm, the optical memory will have a capacity of at least 500 Mbits. This high storage capacity inter alia enables the storage of protective means in the memory which require a comparatively large amount of storage capacity, for example, a colour picture of the owner, the owner's voice in encoded form, or a finger print of the owner.

An optical memory in which user information has not yet been stored is preferably provided with servo tracks during the manufacture of the memory, for example, concentric tracks or a continuous spiral servo track. During the writing of user data, the write spot then accurately follows the servo track. Further details of this operation are described in said book "Principles of Optical Disc Systems", Chapter 5 (Mastering). It is also possible to divide the tracks into sectors during manufacture and to provide each sector with a synchronization zone (heading).

The electrical connection points 2 are connected to microelectronic components 20 accommodated inside the memory card. These components may include, for example, a RAM or an EEPROM and a data processor and are used, for example, for the temporary storage of erasable data or for the storage of a personal identification number (PIN) code.

Figure 1B:
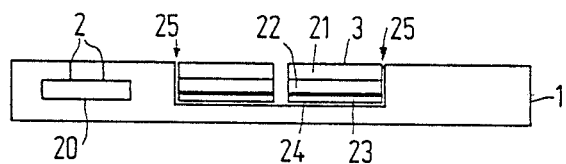

FIG. 1b is a cross-sectional view at an increased scale of the electronic memory card shown in FIG. 1a. The card preferably has a thickness of 0.7 mm (standard dimension). The optical memory preferably has a thickness of 0.5 mm and is composed of several layers. The data layer 23, for example, a tellurium alloy, is sandwiched between a first protective layer 24 and a substrate (22) and has a thickness of approximately 10 μm. A second protective layer 21 is provided on the substrate. The first protective layer 24 may have a small thickness because, due to the embedding of the optical memory in the card, the card itself forms a protective layer for the lower side of the optical memory. The first protective layer is made, for example, of a lacquer or layer of glue (photo-polymer layer). When the optical memory is rigidly connected to the memory card, the first protective layer will be glued to the memory card. The second protective layer 21 consists of, for example, a scratch-resistant silicon layer and must satisfy severe requirements as regards scratch resistance in order to prevent influencing of the data transfer. The substrate 22 of the present embodiment is composed of a thin plastics foil. A layer of reinforced glass is a suitable alternative for the combination of substrate and second protective layer. Considering the small thickness of the substrate, the brittleness of glass will not be problematic in this respect.

In the vertical clearance between the optical memory and the edge of the recess in the memory card there is provided a layer of glue when the optical memory is to be permanently anchored in the memory card. When the optical memory is not permanently anchored, the vertical edge is provided with a profile, for example, a snap-in/out profile.

Figure 2:
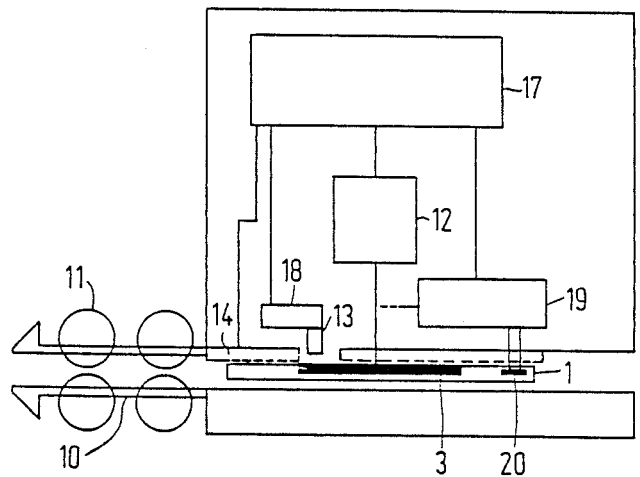
FIG. 2 is a cross-sectional view of apparatus for the transfer of data from and to a memory card as shown in FIG. 1(a+b)

FIG. 2 is a cross-sectional view of apparatus for transferring data from and to a memory card as shown in the FIGS. 1(a+b). The memory card is transported into the apparatus by means of a feed mechanism 10 which includes a number of transport wheels 11, after which it is positioned until the hole 4 provided in the optical memory is aligned underneath the shaft of an electric motor 12. The memory card is subsequently sucked towards the motor by means of a suction device 14. To this end, the suction device receives a control signal from a data processing unit 17. The optical memory disc slides onto the motor shaft by way of the hole 4 provided therein for this purpose. The axis of rotational symmetry of the optical memory disc and the shaft of the motor will then be substantially colinear. Under the control of the data processing unit 17, the motor is subsequently activated so that the entire card is rotated by the motor shaft. The data is transported between the optical memory disc and the data processing unit 17 in the same way as in CD's, that is to say by means of the scanning means 13 which is mounted for radial displacement, for example on a movable arm 18.

The data transport between the microelectronic components 20 and the data processing unit 17 takes place via the information transfer unit 19. The transfer unit 19 in a first embodiment is formed, for example by an input/output interface which is rigidly mounted in the apparatus and which includes a set of slide contacts which contact the connection points 2 of the card after the card has been positioned underneath the motor. Before the card is made to rotate, first the necessary information transfer between the microelectronic components and the data processing unit takes place via the slide contacts from the card to the information transfer unit and vice versa. The transfer unit 19 18 in a second embodiment is connected to the shaft of the motor (as denoted by a broken line) for rotation together with the card. During the positioning of the card, a connection is established between the transfer unit and the connection points on the card. This connection can be realized either by means of slide contacts or by capacitive or inductive coupling. Information transport between the microelectronic components of the card and the transfer unit then takes place during rotation of the card. When the connection between the electronic components and the transfer unit requires the presence of a power supply source in the card, a possible solution consists in providing the card with a power supply 52 such as a battery or photosensitive cells which convert incident light into electric energy. The connection between the microelectronic components and the communication member could alternatively be realized in an optical manner, for example by providing the card with an LED (including a power supply source).

The connection between the information transfer unit and the data processing unit is realized either during standstill of the information transfer unit, for example by means of the slide contacts or by the above described optical connection path 19c or during rotation, for example by capacitive or optical coupling. In such case, the elements 19a and 19b in FIG. 2 would be capacitive or inductive elements. Connections of this kind between a rotating and a stationary object are known from computer tomography, for example see EPA 0 149 280 or DOS 33 31 722.

It will be apparent that the apparatus shown in FIG. 2 is merely one embodiment and that other embodiments can also be used. For example, the memory card may be positioned by a set of controllable clamps instead of being attracted by suction. Furthermore, it is alternatively possible to lift the optical memory out of the card and to rotate it alone by means of the shaft of the motor. Alternatively, the optical memory can be made to rotate in the card. In addition to microelectronic components and an optical memory, a magnetic strip can also be provided on the card.

Figure 3:
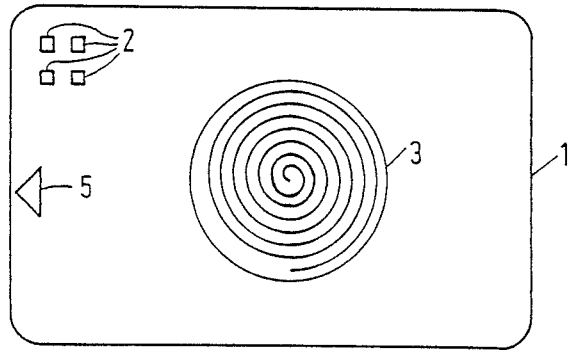
FIG. 3 shows a second embodiment of an electronic memory card in accordance with the invention.

FIG. 3 shows a second embodiment of an electronic memory card in accordance with the invention. This embodiment deviates from the first embodiment in that the optical memory is not provided with a central hole. Corresponding components are denoted by the corresponding reference numerals of FIG. 1. The spiral or concentric track structure now extends substantially from the centre as far as the edge of the disk.

Figure 4:
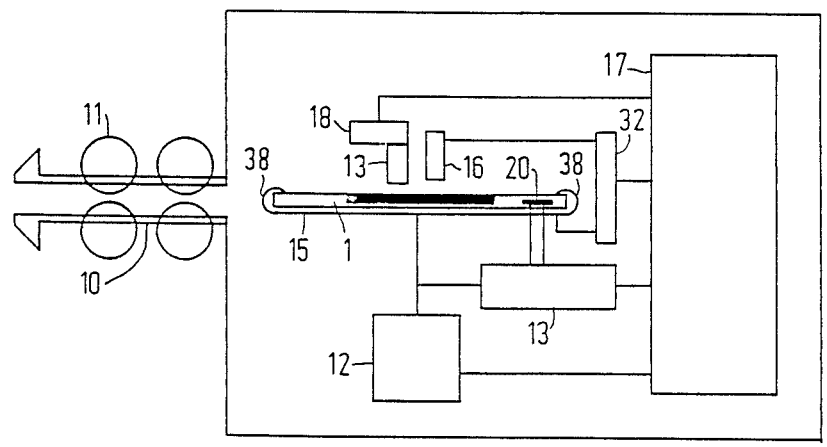
FIG. 4 is a cross-sectional view of apparatus for the transfer of data from and to a memory card as shown in FIG. 3.

FIG. 4 is a cross-sectional view of apparatus for the transfer of data to and from a memory card as shown in FIG. 3. Corresponding elements in FIG. 4 are denoted by the reference numerals used in FIG. 2. A turntable 15 is connected to the motor 12 via the motor shaft. The turntable is suitable for accommodating and clamping a memory card supplied via the feed mechanism 10. The assembly formed by the turntable and the clamped memory card can be driven by the motor so that data is transported to and from the optical memory disc on the card by means of the scanning means 13.

The scanning means 13 is mounted, for example on a movable arm 18 as in a known CD player, so that it can be displaced radially across the surface of the optical memory. The scanning means includes, for example a semiconductor aluminium gallium arsenide (AlGaAs) laser which supplies a sufficient amount of energy for performing read as well as write operations. It will be apparent, however, that when it is merely necessary to read the card, the laser power need only be sufficient for reading the optical memory. The transport of data to and from the optical memory disc, however, requires accurate positioning of the optical memory disc and the scanning means with respect to one another. For this purpose it is necessary to clamp the memory card accurately in a defined position. To this end, the turntable includes means for moving the memory card on the turntable, for example, by control of the clamps 38. To this end, the clamps 38 are controllable and receive control signals from the data processing unit 17. Such control signals are generated on the basis of positioning information which originates from a positioning unit 16 which is connected to an input/output interface 32 whereto the clams are also connected. The input/output interface is also connected to the data processing unit 17. The positioning unit 16 utilizes a detection unit which cooperates with the track pattern on the optical memory disc.

Figure 5A:
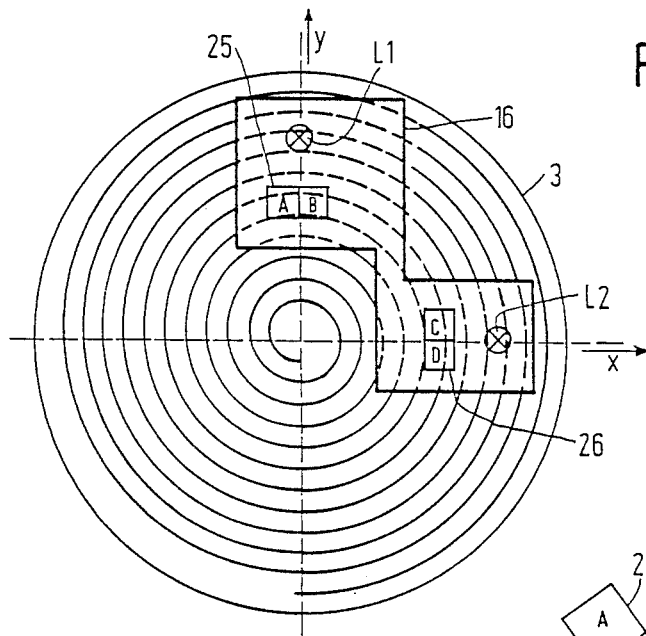
FIG. 5a shows an embodiment of a positioning unit.
Figure 5B:
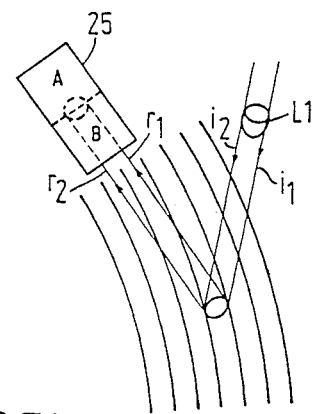
FIG. 5b shows the path followed by the light originating from a light source of the positioning unit.

FIG. 5a is a diagrammatic plan view of an embodiment of a positioning unit which is arranged over the track pattern of the optical disc. The positioning unit 16 includes two light sources L1 and L2, for example two LEDs, each of which preferably emits a substantially parallel light beam, and also includes two detectors 25 and 26. FIG. 5b shows the path followed by the light emitted by the LED L1. The light beam ($i_1$, $i_2$) emitted by the LED L1 is, for example incident at right angles on a number of tracks of the optical disc. Because the light spot of the LED L1 is large with respect to the track pitch which has a magnitude in the order of the wavelength of the light, the track pattern will behave as a grating which disperses the incident light. The first-order beams (or possibly beams of higher order) in the radial direction of the light ($r_1$, $r_2$) dispersed by the grating and originating from L1 is intercepted by the detector 25. Each of the detectors 25, 26 includes two detection elements, for example photodiodes (A, B and C, D, respectively).

Displacement of the memory disc in a direction perpendicular to the separating line between the two photodiodes of the same detector causes a shift of the direction of the tracks with respect to the detector at the area of the incident light, and hence a shift of the first-order dispersed light beams ($r_1$, $r_2$) incident on the photodiodes. Each of the photodiodes of the same detector picks up an amount of dispersed light and the difference in intensity between the two photodiode signals provides an error indication signal. The photodiodes of each detector are aligned with respect to the mechanical axis of rotation of the turntable and their respective light source in such a manner that the memory disc is suitably positioned when the error signal is zero. This is because the measured intensity difference between the photodiodes equals zero when an equal amount of dispersed light is incident on both photodiodes A and B of the detector 25.

The light source L1 and the detector 25 and the light source L2 and the detector 26 enable positioning in the x-direction and the y-direction, respectively. By moving the card in the y-direction, prior to the rotation operation, until the error signal indication given by the detector 25 is zero and by subsequently moving the card in the x-direction until the error signal indication given by the detector 26 is zero, the optical memory can be accurately positioned with respect to the scanning means 13, which is arranged to be stationary with respect to the light sources L1 and L2.

The error signal indication given by the positioning unit is converted into control signals by the data processing unit in order to be applied to the controllable clamps 38, via the input/output interface 32, so that the card is displaced and correct positioning is obtained.

A simpler embodiment of the positioning unit 16 includes only one light source and one detector which includes two photodiodes. Either these photodiodes are arranged as shown in FIG. 5a, in which case positioning takes place in only one direction (positioning in the other direction is then provided, for example by the fixed position of the clamps) or the light source is centrally arranged between the photodiodes and it is checked whether both photodiodes receive an equal amount of dispersed light.

The use of the positioning unit shown in FIG. 5a thus enables correct positioning of the optical memory disc, even when no central hole is provided therein. However, it will be apparent that other possibilities also exist for positioning the memory card and the scanning means with respect to one another. For example, use can be made of a reference cross 51 provided on either the memory disc or the card.

In a further embodiment of a positioning unit, the light source and the detector are mounted on an eccentric. By rotation of the light source and the detector on the eccentric and by analysis of the first-order dispersed light incident on the detector, the data processing unit can collect information as regards the position of the optical memory, said information being subsequently translated into control information for the clamps.

Figure 6A:
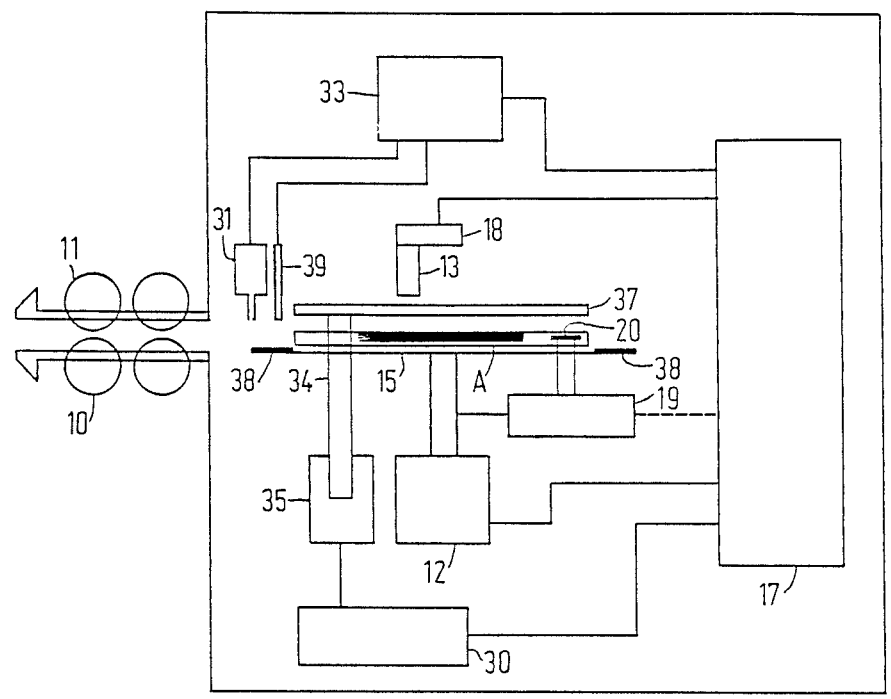
FIG. 6a is a cross-sectional view of a modified data transfer apparatus in accordance with the invention.

FIG. 6a is a cross-sectional view of a modified version of the apparatus shown in FIG. 4. Corresponding elements are denoted by the same reference numerals as used in FIG. 4. The modified version is particularly suitable for suppressing disturbances occurring in the optical transmission between the scanning means and the optical disc due to scratches in the optical disc. This is because the occurrence of scratches in the surface of the optical disc cannot be precluded during the life of such a memory card. Such scratches disturb the read or write beam of the scanning means, thus disturbing the data transmission.

In order to eliminate this kind of disturbance, the apparatus shown in FIG. 6 includes a glass or plastics protective plate 37 which is displaceable by means of two rods 34, 36 (only one rod is shown in FIG. 6a for the sake of clarity). Each of the rods is mounted on a transport means (35), for example a piston or a gear-wheel mechanism. The transport means is connected to the data processing unit 17 via a first control unit 30.

Figure 6B:
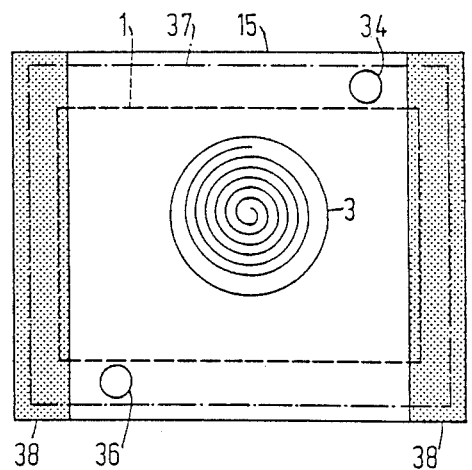

FIG. 6b is a plan view of a detail of the modified apparatus shown in FIG. 6a. The protective plate 37 is mounted on the rods 34, 36 which can be laterally displaced along the memory card. To this end, the turntable 15 is provided with two openings wherethrough he rods can be moved. The protective plate 37 is arranged over the side of the memory card 1 which carries the optical memory. The clamps 38 are suitable for clamping the memory card as well as the protective plate.

The apparatus shown in FIG. 6a also includes a spray nozzle 31 which is controlled by a second control unit 33 which is connected to the data processing unit 17, said spray nozzle serving to spray a small quantity of a volatile liquid, for example alcohol, onto the memory card. The spray nozzle 31 is arranged at the entrance of the apparatus directly behind the feed mechanism 10, so that the liquid can be applied immediately when the card is introduced into the apparatus.

When the memory card is introduced into the apparatus it is transported to the turntable 15 by the transport wheels 11. As soon as the card enters the apparatus, the data processing unit 17 applies a first control instruction to a control unit 33 which translates such instruction into a first activation signal for the spray nozzle 31. Under the control of the first activation signal, a small quantity of alcohol is sprayed onto the memory disc after which the spray nozzle is slightly withdrawn so as not to interfere with the clamps of the turntable 15. Subsequently, the data processing unit 17 generates a second control instruction which is applied to another control unit 30 which translates the second control instruction into a second activation signal. Under the control of the second activation signal, the rods 34 and 36 are activated in order to arrange the plate 37 on the memory card. When the plate bears on the memory card, the rods are moved away from the turntable so as not to interfere with the rotation of the card. After removal of the rods, the clamps 38 of the turntable are activated in order to portion the memory card and the glass plate arranged thereon onto the turntable. When the assembly has been clamped and positioning completed, rotation may commence so that data transfer can take place.

After data transfer the plate 37 is removed under the control of the data processing unit 17 and the control unit 30. To this end, the rods are guided to the plate again in order to lift the plate. Subsequently, the memory card is removed from the turntable. During this removal operation it is also possible to remove any superfluous liquid from the card. This is realized, for example by means of an absorption unit 39 (for example, a suction nozzle or a holder with an absorbing cloth) which is controlled by means of the control unit 33.

The use of a volatile liquid and the plate 37 offers the advantage that the liquid will fill any scratches in the optical disc. The plate ensures that the liquid remains on the disc during rotation of the card. Light diffracted by the plate and the liquid can be simply corrected for.

The invention is not restricted to memory cards which include only one optical disc. For example, it is possible to provide the card with two optical discs, one of which is also erasable.

What is claimed is:

1. Apparatus for transferring data and supplementary information between a data processor and a rectangular memory card, which card comprises:
   a disc-shaped optical memory unit retained in a recess of one surface of said card, said memory unit having a surface substantially coplanar with said card surface and which has thereon a continuous succession of data storage tracks which are substantially complete circles concentric around the center of the memory unit, such tracks being optically readable from said surface of the memory unit; and
   at least one microelectronic component included in said card which is connected to connection points on said one surface thereof, such microelectronic component being adapted to store said other information therein;
   such apparatus comprising:
   rotary retaining means for supporting said card and rotating at least said memory unit therein about an axis of rotation of said rotary retaining means, said rotary retaining means being further adapted to position said card thereon so that the center of said memory unit is substantially colinear with said axis of rotation;
   scanning means for producing a scanning beam incident on said optical memory unit and continuously displacing such beam radially with respect to said axis of rotation so as to successively scan the successive tracks of said memory unit during rotation thereof and thereby transfer data between said memory unit and said data processor; and
   an information transfer unit coupled to the connection points on said surface of said card and to said data processor for transferring said supplementary information between said microelectronic component and said data processor.

2. Apparatus as claimed in claim 1, wherein said rotary retaining means rotates said information transfer unit about said axis of rotation while rotating said memory unit about such axis.

3. Apparatus as claimed in claim 1 or 2, wherein said information transfer unit is capacitively coupled to said data processor for executing said transfer of information between said microelectronic component and said data processor.

4. Apparatus as claimed in claim 1 or 2, wherein said information transfer unit is inductively coupled to said data processor for executing said transfer of information between said microelectronic component and said data processor.

5. Apparatus as claimed in claim 1, further comprising a positioning unit which includes a first detection system for detecting deviation in a first direction between the axis of rotation of said rotary retaining means and the center of said memory unit, said first detection system including at least one radiation source which emits a substantially parallel beam and at least two radiation-sensitive detection elements responsive to such beam to generate a first detection signal indicating said deviation, said positioning unit being connected to said rotary retaining means to supply said first detection signal thereto, said rotary retaining means including means for moving the memory card in said first direction under the control of said first detection signal so as to reduce the deviation in said first direction to zero.

6. Apparatus as claimed in claim 5, wherein said positioning unit further includes a second detection system identical to said first detection system for producing a second detection signal indicating deviation in a second direction orthogonal to said first direction and supplying the second detection signal to said rotary retaining means, said rotary retaining means including means for moving the memory card in said second direction under the control of said second detection signal so as to reduce the deviation in said second direction to zero.

7. Apparatus as claimed in claim 1, wherein said rotary retaining means comprises a turntable and clamps for controllably positioning the memory card on the turntable.

8. Apparatus as claimed in claim 1, wherein said memory unit has a hole therein at the center thereof, and said rotary retaining means comprises a shaft which extends into said hole when the center of said memory unit is colinear with said axis of rotation of said rotary retaining means.

9. Apparatus as claimed in claim 1, further comprising a protective plate and means for positioning such plate on said surface of the memory unit, and a spray nozzle for spraying a quantity of volatile liquid onto said surface of the memory unit prior to the positioning of said plate thereon.

10. An electronic memory card having a rectangular shape and which includes:
a disc-shaped optical memory unit retained in a recess on one surface of said card, said memory unit having a surface substantially coplanar with said card surface and which has thereon a continuous succession of data storage tracks which are substantially complete circles concentric around the center of the memory unit, such tracks being optically readable by a beam of radiation directed on said surface of the memory unit during rotation of the memory unit around an axis through the center thereof; and
at least one microelectronic component included in said card which is connected to connection points on said one surface thereof, such microelectronic component being adapted to store therein information supplementary to the data stored in said memory unit.

11. An electronic memory card as claimed in claim 10, further comprising a power supply source therein for powering said microelectronic component.

12. An electronic memory card as claimed in claim 11, wherein said power supply source comprises a photoelectric cell on said surface of the card for converting light incident thereon into electrical energy.

13. An electronic memory card as claimed in claim 10, wherein said memory unit has a hole therein at the center thereof.

14. An electronic memory card as claimed in claim 10 wherein said memory unit is rigidly anchored in said card, so that said memory unit will be rotated about said axis when said card is rotated about said axis.

15. An electronic memory card as claimed in claim 10 wherein said memory unit is detachably accommodated in said card, so that said memory unit can be rotated about said axis independently of said card.

16. An electronic memory card as claimed in claim 10, wherein the data storage tracks of the optical memory unit are on a substrate which is sandwiched between first and second protective layers.

17. An electronic memory card as claimed in claim 16, wherein said first protective layer is made of a plastic foil and said second protective layer is made of reinforced glass or of plastics having a silicone layer therein.

18. An electronic memory card as claimed in claim 10, wherein the optical memory unit has a diameter of between 2 cm and 5 cm.

* * * * *